US005718030A

United States Patent [19]
Langmack et al.

[11] Patent Number: 5,718,030

[45] Date of Patent: Feb. 17, 1998

[54] METHOD OF DRY ABRASIVE DELABELING OF PLASTIC AND GLASS BOTTLES

[75] Inventors: Clark B. Langmack; Charles E. Langmack, both of Gates Mills; John C. Langmack, Cleve. Hts, all of Ohio

[73] Assignee: Langmack Company International, Cleveland, Ohio

[21] Appl. No.: 276,625

[22] Filed: Jul. 18, 1994

[51] Int. Cl.[6] .................... B32B 35/00

[52] U.S. Cl. .................... 29/426.3; 29/426.4; 198/459.2; 198/459.3; 15/63; 15/88.3; 156/344; 451/241; 451/245; 451/332

[58] Field of Search .................... 29/426.3, 426.4; 198/459.2, 459.3, 480.1; 156/344, 584; 15/59, 60, 63, 88.2, 88.3, 236.01, 236.1; 451/332, 338, 241, 245; 241/24.18

[56] References Cited

U.S. PATENT DOCUMENTS

| | | | |
|---|---|---|---|
| 2,516,998 | 8/1950 | Kimball et al. | 15/101 |
| 2,868,243 | 1/1959 | Henschen et al. | 198/459.2 |
| 4,013,497 | 3/1977 | Wolf | 156/154 |
| 4,059,186 | 11/1977 | Aschberger et al. | 198/480.1 X |
| 4,325,775 | 4/1982 | Moeller | 156/584 |
| 4,479,343 | 10/1984 | Tincati | 198/480.1 X |
| 4,599,131 | 7/1986 | Matuszak | 156/584 |
| 4,701,973 | 10/1987 | McBrady et al. | 15/306 B |
| 4,715,920 | 12/1987 | Ruppman et al. | 156/344 |
| 4,830,699 | 5/1989 | Burlet et al. | 156/344 |
| 4,944,832 | 7/1990 | Abe et al. | 156/584 |
| 4,956,033 | 9/1990 | Martin et al. | 156/94 |
| 5,317,794 | 6/1994 | Lerner et al. | 156/344 X |
| 5,372,672 | 12/1994 | Seifert et al. | 156/344 X |

FOREIGN PATENT DOCUMENTS 1126538 of 1984 U.S.S.R. .

*Primary Examiner*—S. Thomas Hughes
*Attorney, Agent, or Firm*—Robert J. Fay, Esq.

[57] ABSTRACT

A dry abrasive delabeling apparatus for both plastic and glass bottles, sometimes called a label stripper, in which the bottles are fed by an in-feed starwheel to a circular starwheel which rotates the bottles slowly. Within the starwheel are wire bristle brushes rotating at a high speed against the bottles to flick off paper, foil, or plastic from the label on the bottle while restraining the bottle in close contact to the ends of the wire bristle by means of a rubber bladder to press against the bottles. The bottles are held against the wire bristles while the bottles are rotated as they are held against the bladder. The debris is vacuumed away from the apparatus.

9 Claims, 2 Drawing Sheets

METHOD OF DRY ABRASIVE DELABELING OF PLASTIC AND GLASS BOTTLES

SUMMARY OF THE INVENTION

This invention relates to the delabeling by a dry abrasive method of plastic and glass bottles. When bottles are recycled, whether they be glass or plastic for beverages of 7 ounces to 32 ounces or more, they must be delabeled or stripped of their label. That is the paper, foil, or plastic must be removed from the bottle. Certainly there are soaking methods which are used, but downtime for cleaning is a disadvantage. In addition, there are the costs of operational environmental problems.

This method utilized is a dry abrasive method in which the bottles are abraded by a wire bristle brush to remove the neck label on one portion of the bottle and the product label on the large portion of the bottle. Another brush or portion of a brush will be used on this portion. The bottles will be fed by a screw conveyor to provide good spacing to an in feed starwheel which in turn feeds a circular starwheel mechanism. This is a relatively high speed mechanism which may rotate at 18 RPM and delabel 800 bottles per minute. The starwheel mechanism will enclose a wire brush that will extend to cover all the parts of the label at roughly 3,000 to 4,000 RPM to flick off the paper label, or foil label which may be firmly bonded to the plastic.

While the brushes are rotating, the bottles are pressed against a rubber bladder which provides some resistances to sliding and causes the bottle to rotate so that all external surfaces of the bottle are abraded by the wire bristles. This causes paper, foil, or paint label debris, which will be sucked out of the work area, to be disposed of. In one revolution around the starwheel mechanism the bottle will be abraded on all of its external surface where it faces the wire bristles and a pressure sensor will adjust the pressure on the bottles. The neck brush may be omitted if there is no neck label.

Between the screw conveyor and the starwheel mechanism is an in feed starwheel to position the bottles accurately in the starwheel mechanism with some spacing between the bottles. On the exit of the bottles at about 340 degrees later is an exit starwheel to take the bottles off the starwheel mechanism and feed them to the next process station.

The principle object of the invention is to impinge the wire bristles against the exterior surfaces of the bottle so that the plastic bottles may be melted down and blow molded again without paint or paper or metal contaminants. The glass bottles will be cleaned and refilled.

BACKGROUND OF INVENTION

Delabeling is a known art, but has been fraught with problems. Examples are Kimball et al U.S. Pat. No. 2,570,992, Wolf U.S. Pat. No. 4,013,492, Moeller U.S. Pat. No. 4,325,775, Burlet et al U.S. Pat. No. 4,830,699, Ruppmann et al U.S. Pat. No. 4,915,920, Matuszak U.S. Pat. No. 4,599,131, McBrady et al U.S. Pat. No. 4,701,973, Martin et al U.S. Pat. No. 4,956,033 and Soviet Union 1126538. After efforts to soak off labels were discarded because of the downtime spent in cleaning out washing tubs, dry abrasive techniques were tried in Soviet Union 1126538. Relatively, this technique, need refining as the inventor has evolved a use of an in feed conveyor and a stabilized bottle holder on the starwheel mechanism which drives the bottles with a rubber bladder to support the bottles as they are being delabeled.

DETAILED DESCRIPTION OF THE INVENTION

In many parts of the world there are a great variety of glass bottles that must be recycled. Some of these are small 7 ounce bottles, others are 32 ounces and more. The same is true of plastic whether it is P.E.T. or PVC or other plastics. These are covered with paper glued to the bottle or are painted with plastic or silver colored foil since the label has been shown to be a contaminant in the melting and blow molding of the plastic. On the glass bottles these will be reused and must show as little scratching or wear as possible. This apparatus and method is designed to take any shipment of bottles in one size and delabel abrasively the label on the bottle when another size or type of the component pads of the apparatus are changed to fit the bottle size. That is the feed screw is changed as well as the in feed starwheel, the starwheel mechanism, the brushes and the exit starwheel.

Figure 1:
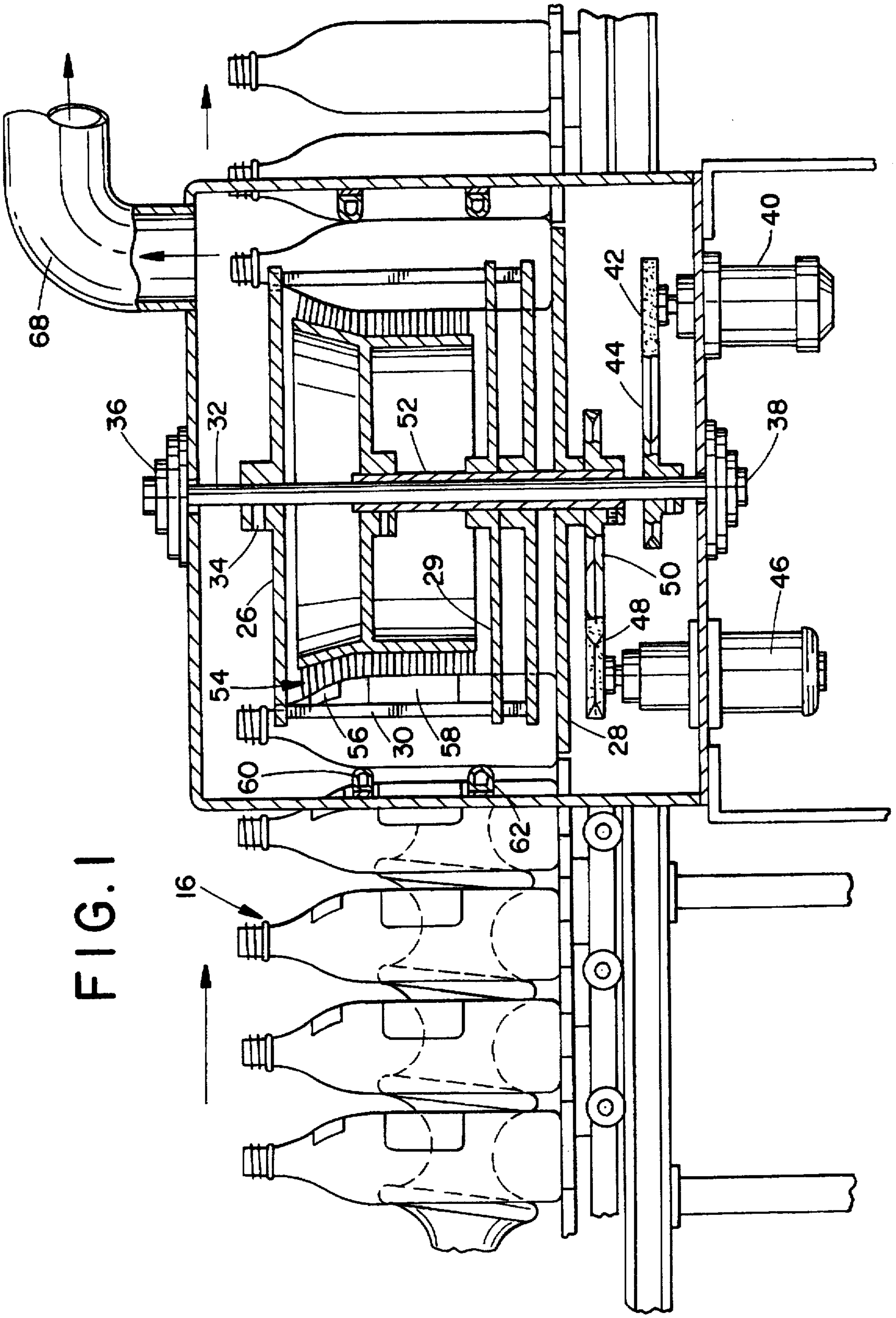
FIG. 1 is a cross sectional top view of the delabeling apparatus and FIG. 2 is a top view of the apparatus.
Figure 2:
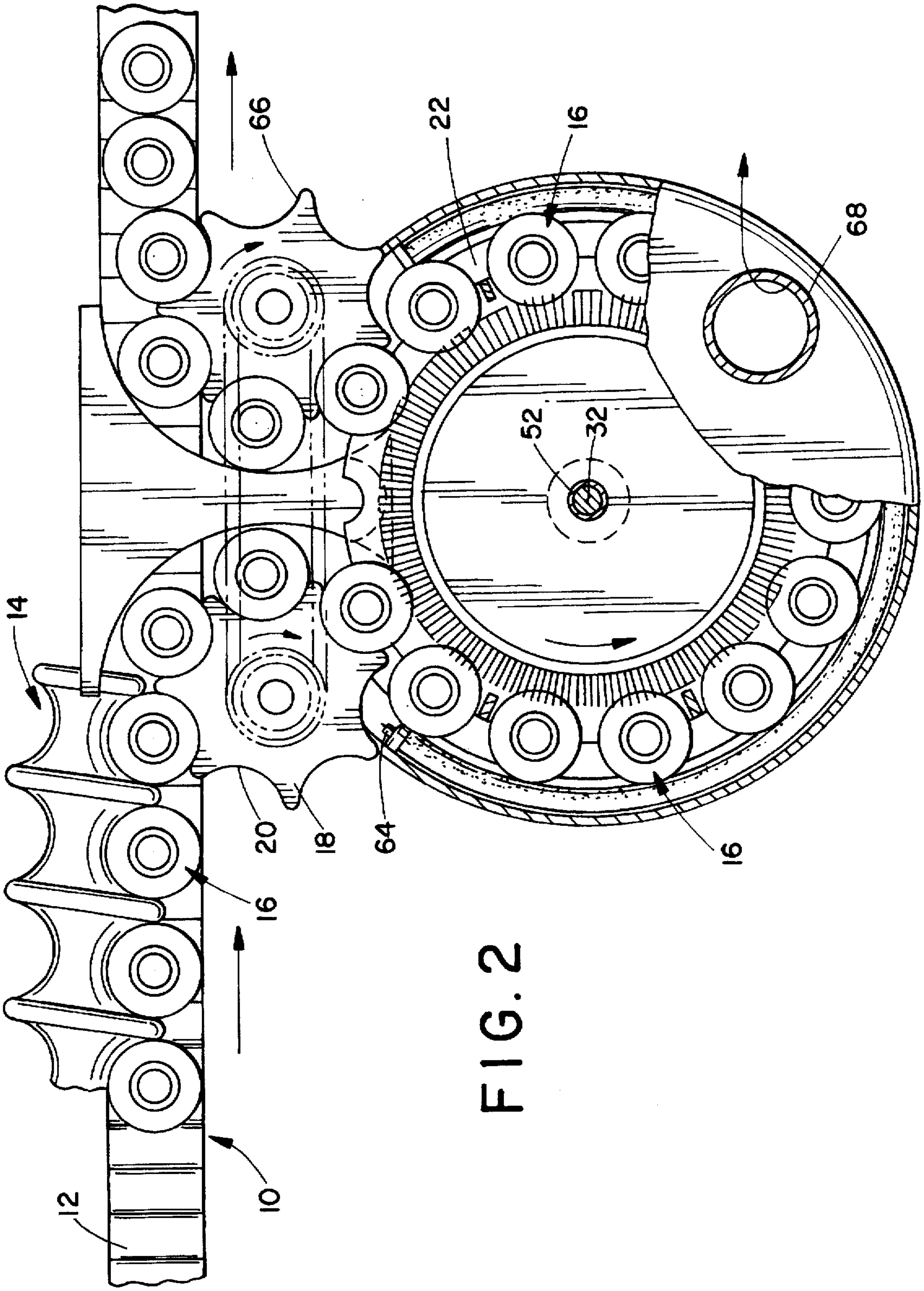

FIG. 1 shows a front cross sectional view of the apparatus being fed. From the left of the drawing (10) is a conveyor with a segmented conveying surface (12) being driven by a screw drive (14) with a number of large bottles (16) on the conveyor as the bottles approach the in feed starwheel (18). They are positioned in one of the notches (20), in the starwheel. As it feeds the circular starwheel mechanism (22), the bottles are secured at the base by a matching portion of the starwheel mechanism (28) and by a neck support (26) and support (29). These are held together by a vertical member (30) and fastened to the drive means (32) by screws at (34). Drive shaft (32) has bearing support at (36) and (38) on each end of the shaft. Note that motor drives sheave (42) is connected to belt (44) and drive shaft (32). The two sheaves are concentric. The other motor (46) drives sheave (48), belt (50), and the concentric shaft (52).

This power source drives bristle brushes (54) against the neck label (56) and bottle label (58). To prevent outward movement of the bottles by the force of the bristles impinging on the bottle two rubber bladders are shown at (60) and (62) which are filled with a fluid at a pressure set by the pressure sensor switch, one of which is shown at 64.

In operation, the motor 40 drives shaft 32 at about 18 RPM to force the starwheel mechanism and its top driven support 26 and bottom driven support 28 to roll the bottles against the rubber bladders. This exposes all surfaces of the bottle to the wire bristles which impinge on the interior surface of the bottles only. This support provided for the bottle on both the interior and exterior sides of the bottle. This keeps the bottle vertical so that the forces from the wire bristle will not tilt the bottle on the starwheel mechanism, thus changing the wire bristle action on the bottle. When glass bottles are being delabeled, the bristle has a hardness of Rockwell C scale of 45 to 65. When plastic is being delabeled, the hardness is 35 to 65 on the same scale.

As the bottles complete the starwheel mechanism, they are unloaded by an exit starwheel 66 to the bottle conveyor 12, Debris from the wire bristles is evacuated from the delabeling mechanism by an exhaust port 68 attached to a source of vacuum.

With a wide variety of bottle size, it will be necessary to have a quick change over to accommodate the needs of the bottling firm. As the bristle wears, it may be necessary to increase the pressure in the rubber bladder to hold the brush against the bottle. About 800 bottles may be delabeled per minute, and in a tight fit for best performance the delabeler removes just the label without excessive scratching of the plastic bottle or any scratching of the glass bottle. By careful adjustment of the pressure switch sensor only the very tips of the bristle will touch the bottles and the rapid rotation of 3,000–4,000 RPM will clear all sides of the bottle that are delabeled. With 3 to 5 rotations of the bottle as it progresses around the starwheel mechanism, all the label will be removed.

With plastic bottles, a small portion of the plastic may be removed. With glass because of its hardness no scratch marks will be seen. When the bristles tips wear, the pressure sensor will increase the pressure in the bladders so that the worn bristle tips will be in contact with the bottle and remove the label.

Having disclosed the basic components of the plastic and glass bottle delabeling method the invention is not to be limited to the specific method disclosed, but to the claims which follow.

We claim:

1. A method of dry abrasive delabeling of plastic or glass bottles having either paper labels or plastic labels, comprising the steps of:

a) feeding bottles to an in-feed starwheel conveyor;

b) feeding the bottles from the starwheel in-feed to a circular starwheel for delabeling;

c) abrading the bottles within the circular star wheel with a wire bristle brush having wire bristles rotated at relatively high speed with ends of the bristles applying an impinging force on the sides and neck of the bottles, thereby removing the labels from the bottles;

d) rotating the bottles on the starwheel to roll the bottles against a bladder which is inflated to a pressure set by a pressure sensor switch to apply pressure on the bottles that acts against the impinging force applied by the wire bristles;

e) off loading the bottles from the circular star wheel to a star conveyor; and f) evacuating and collecting dust particle debris created from the abrading step.

2. The method of claim 1, wherein the abrading step includes using wire for said wire bristles of a greater hardness than that of the plastic bottles to abrade the surface of the plastic bottles to remove paint particles and paper from the plastic bottles.

3. The method of claim 1, wherein the abrading step includes using wire for said wire bristles of a lesser hardness than that of the glass bottles so that the glass bottles are not scratched by the wire bristles.

4. The method of claim 1, wherein the step of rotating the bottles on the starwheel further includes rotating the wire bristles such that the rotating forces generated by the starwheel rotate the bottle in the opposite direction to the wire bristles to cover all surfaces of the bottle.

5. The method of claim 1 in which the feeding step includes feeding plastic bottles consisting of P.E.T. or P.V.C. plastic.

6. The method of claim 1 in which the feeding step includes feeding plastic bottles made of P.E.T. or P.V.C. and the abrading step includes using wire for said wire bristles having a Rockwell C Hardness of 35 to 65.

7. The method of claim 1, wherein the abrading step as applied to glass bottles uses wire for said wire bristles having a Rockwell C Hardness of 65.

8. The method of claim 1, wherein the rotating step includes controlling inflating of the bladder by the pressure sensor switch to vary the pressure applied on the bottles and compensate for wear of the wire bristles over time.

9. The method of claim 1, further including rotating the wire bristle brush at 3,000 to 4,000 RPM in said abrading step.

* * * * *